(12) United States Patent
Tomlin et al.

(10) Patent No.: US 9,237,739 B1
(45) Date of Patent: Jan. 19, 2016

(54) PET-AT-REST SYSTEMS

(71) Applicants: Barbara Tomlin, Independence, MO (US); Verceena Brown-Coody, Parkville, MO (US)

(72) Inventors: Barbara Tomlin, Independence, MO (US); Verceena Brown-Coody, Parkville, MO (US)

( * ) Notice: Subject to any disclaimer, the term of this patent is extended or adjusted under 35 U.S.C. 154(b) by 153 days.

(21) Appl. No.: 14/040,279

(22) Filed: Sep. 27, 2013

Related U.S. Application Data (60) Provisional application No. 61/707,541, filed on Sep. 28, 2012.

(51) Int. Cl.
*A01K 1/035* (2006.01)
*B60R 22/10* (2006.01)

(52) U.S. Cl.
CPC .............. *A01K 1/0353* (2013.01); *B60R 22/10* (2013.01)

(58) Field of Classification Search
CPC . A01K 1/0236; A01K 1/0272; A01K 1/0353; A01K 1/0613; B60R 22/022; B60R 22/10; B60R 2022/263; B60R 2011/0007; B60R 2011/0014; B60R 2011/0063; B60N 3/001; B60N 3/101; A47B 31/06
USPC ........ 119/496, 497, 28.5, 712, 753, 769, 771; 5/118; 108/44; 296/35.4, 35.1, 35.3, 296/97.21; 224/275
IPC .............. A01K 1/035, 1/06; B60R 22/00, 22/10
See application file for complete search history.

(56) References Cited

U.S. PATENT DOCUMENTS

| | | | |
|---|---|---|---|
| 2,790,184 A * | 4/1957 | Testa | 5/118 |
| 5,085,153 A * | 2/1992 | McKee | 108/44 |
| 5,588,393 A * | 12/1996 | Heilborn | 119/28.5 |
| 6,588,821 B2 | 7/2003 | Worrell et al. | |
| 6,591,787 B1 | 7/2003 | Gantz et al. | |
| D522,181 S | 5/2006 | Lauzon | |
| 7,204,205 B2 * | 4/2007 | O'Donnell | 119/771 |
| D588,755 S | 3/2009 | Farrell | |
| 7,503,280 B2 | 3/2009 | Troutman et al. | |
| 7,857,370 B2 * | 12/2010 | Heller | 296/24.46 |
| 8,091,513 B1 * | 1/2012 | Garcia | 119/771 |
| 8,607,735 B1 * | 12/2013 | Klinker | 119/28.5 |
| 2006/0150922 A1 | 7/2006 | Kroculick | |
| 2008/0314336 A1 * | 12/2008 | Church et al. | 119/771 |
| 2010/0205747 A1 * | 8/2010 | Iskowitz | 5/655 |
| 2011/0197818 A1 * | 8/2011 | Simon et al. | 119/28.5 |

* cited by examiner

*Primary Examiner* — Lisa Tsang
(74) *Attorney, Agent, or Firm* — RG Patent Consulting, LLC; Rachel Gilboy (57) ABSTRACT

A pet console seat system for bridging a gap between a front seat and a back seat in a vehicle has a pet console seat forming a pet console seat assembly having a Tee-shaped cushion including a first end, a second end, a top side, a bottom side, a left side, and a right side; a bottom-board insert; and a protective cover coupled to the Tee-shaped cushion. The pet console seat bridges a gap between the front seat and the back seat of the vehicle by creating the seat and a planar path for the pet to travel between the front seat to the back seat. The pet console seat protects a console of the vehicle from damage caused by nails scratching and chewing with sharp incisors of the pet.

15 Claims, 6 Drawing Sheets

PET-AT-REST SYSTEMS

CROSS-REFERENCE TO RELATED APPLICATION

The present application is related to and claims priority from prior provisional application Ser. No. 61/707,541, filed Sep. 28, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of car seats and more specifically relates to a pet console seat system for bridging a gap between a front seat and a back seat in a vehicle.

2. Description of the Related Art

The center console in an automobile refers to the control-bearing surfaces in the center of the front of the vehicle interior. The term is applied to the area beginning in the dashboard and continuing beneath it, and often merging with the transmission tunnel which runs between the front driver's and passenger's seats of many vehicles.

Traditionally, vehicles with a gear stick have placed this control where the two areas of console and tunnel merge, or at the rear-most end of the console in front-wheel-drive vehicles without transmission tunnels. In some modern vehicles, particularly vans, the gear stick is mounted in the front, more vertical part of the center console to be within better reach of the driver without requiring a long stalk mounted on the steering column Increasingly, center consoles include a wide variety of storage compartments and cup holders, some of them with refrigerator, in addition to the more traditional use as purely a surface for instrumentation and controls.

Many individuals have pets. When traveling in a car, pets often try to climb from the backseat to the front seat via the center console. When doing so, they may not only hurt themselves, but they may also distract the driver. This can cause injury to the pet or owner, as well as damage to the vehicle; this is not desirable.

Various attempts have been made to solve the above-mentioned problems such as those found in U.S. Pat. Nos. 7,503,280; 6,591,787; D588755; 6,588,821; D522,181; and 2006/0150922. This art is representative of car seats for pets. None of the above inventions and patents, taken either singly or in combination, is seen to describe the invention as claimed.

Ideally, a pet console seat system should be user-friendly and safe in-use and, yet would operate reliably and be manufactured at a modest expense. Thus, a need exists for a pet console seat system for bridging a gap between a front seat and a back seat in a vehicle as used to improve the safety of animals and occupants in vehicles during transport and to avoid the above-mentioned problems.

BRIEF SUMMARY OF THE INVENTION

In view of the foregoing disadvantages inherent in the known car seat devices art, the present invention provides a novel pet console seat system for bridging a gap between a front seat and a back seat in a vehicle (Pet-at-rest-systems). The general purpose of the present invention, which will be described subsequently in greater detail is to provide a pet console seat system for bridging a gap between a front seat and a back seat in a vehicle as used to improve the safety of animals and occupants in vehicles during transport.

The present invention protects a vehicle's center console from damages caused by pets by providing a bridge from the backseat to the front seat for easy access and less commotion to distract the driver. The device allows pets to rest comfortably on the middle console. Further, it enables pet owners to store pet treats and supplies in convenient side pockets. The present invention is ideal for pet owners, veterinarians, groomers, and individuals who may need to transport animals in a vehicle.

A pet console seat system for bridging a gap between a front seat and a back seat in a vehicle is disclosed herein, in a preferred embodiment, comprising a pet console seat forming a pet console seat assembly having a T-shaped cushion (similar profile to that of an instrument case such as a guitar) including a first end, a second end having at least one metal ring, a top side, a bottom side, a left side, and a right side; an approximately 5-foot by 5-foot bottom-board insert; and a protective cover coupled to the T-shaped cushion. The parameters of the pet console seat are defined by the first end, the second end, the top side, the bottom side, the left side, and the right side. The pet console seat bridges a gap between the front seat and the back seat of the vehicle by creating the seat and a planar path for the pet to travel between the front seat to the back seat. The pet console seat protects a console of the vehicle from damage caused by nails scratching and chewing with sharp incisors of the pet. The T-shaped cushion is coupled to the bottom-board insert via at least one webbing material forming the pet console seat assembly. The bottom-board insert adds structural integrity to maintain a shape of the T-shaped cushion in an in-use condition by the pet.

The pet console seat embodiment for use in a small vehicle (including for example a car) using the pet console seat assembly is approximately 8-inches in width, 36-inches in length, and 4-inches high. The pet console seat further comprises a horizontal support board located on the second end to bridge a first bucket back seat and a second bucket back seat together.

The first end is friction-fitted in between a driver's bucket seat and a passenger's bucket seat of the vehicle and is (substantially) planar relative to and locatable above a console of the vehicle. The second end rests and is (substantially) planar to the back seat of the vehicle. The at least one metal ring located on the second end is used to couple a pet-safety harness removably-coupled to the pet to restrain the pet from use when desired. The at least one metal ring is coupled to the second end of the T-shaped cushion via at least one button-hole slit in preferred embodiments.

The protective cover protects the T-shaped cushion from fluids, dirt, and hair of the pet and allows the pet to be elevated for travel in the vehicle. The protective cover is removable, reusable, and machine-washable. The protective cover further comprises at least one fastener. The at least one fastener may comprise hook and loop fasteners. The protective cover comprises upholstered fabric. The protective cover further comprises a first pocket and a second pocket both located on the right side of the protective cover. The first pocket and the second pocket are used for conveniently storing treats and supplies for the pet such that they are readily accessible by a driver.

A kit is also embodied herein for the pet console seat system for bridging a gap between a front seat and a back seat in a vehicle comprising the pet console seat assembly; a plurality of protective covers in a variety of colors and fabric/materials to suit user preference; and a set of user installation instructions.

A method of use for a pet console seat system for bridging a gap between a front seat and a back seat in a vehicle comprises the steps of: choosing a pet console seat assembly to fit dimensions of the vehicle; friction-fitting a first end of a T-shaped cushion in-between a driver's seat and a passenger's seat of the vehicle; placing a second end of the T-shaped cushion on a back seat in the vehicle; placing the pet console seat; attaching a pet safety harness to a metal ring on the second end of the pet console seat to secure the pet; the pet walking from the pet console seat to the back seat; transporting the pet; un-fastening the pet safety harness from the metal ring; and removing the animal from pet console seat once a destination is reached.

The present invention holds significant improvements and serves as a pet console seat system for bridging a gap between a front seat and a back seat in a vehicle. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention pet console seat system for bridging a gap between a front seat and a back seat in a vehicle, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to car seat device and more particularly to a pet console seat system for bridging a gap between a front seat and a back seat in a vehicle as used to improve the safety of animals and occupants in vehicles during transport. Public highway and street safety is increased through use of the present invention.

Generally speaking, the Pet-At-Rest Systems enables pets to safely and comfortably rest on the middle console while riding in a car. This innovative product may comprise a guitar (case)-shaped cushion, made from foam or other suitable material, with a bottom board insert. The board and the cushion may be secured together with a webbing material. There may be a metal ring, to which a pet-safety harness may attach, on the back of the cushion. The entire cushion may be covered in an upholstered fabric. The fabric can be wrapped around the cushion and secured together with hook-and-loop fasteners. This can allow people to easily remove the fabric and clean it as needed. It may also be offered in a variety of interchangeable colors and fabric/materials to suit user preference. There may be two pockets on the side of the fabric for storing pet treats and supplies. The cushion may have an optional support board for bucket seats, and may be offered in both large and small sizes. The small cushion may measure approximately 8" wide, 36" long, and 4" high. The large cushion may measure approximately 12" wide, 36" long, and 4" high.

Referring now to the drawings more specifically by numerals of reference there is shown in FIGS. 1-5, various views of pet console seat system 100 for bridging a gap between front seat 182 and back seat 188 in vehicle 180.

Pet console seat system 100 for bridging a gap between front seat 182 and back seat 188 in vehicle 180 comprises pet console seat 102 forming pet console seat assembly 106 having T-shaped cushion 110 including first end 116, second end 122, top side 128, bottom side 134, left side 140, and right side 146; an approximately 5-foot by 5-foot bottom-board insert 150; and protective cover 160 coupled to T-shaped cushion 110. The parameters of pet console seat 102 are defined by first end 116, second end 122, top side 128, bottom side 134, left side 140, and right side 144.

Figure 1:
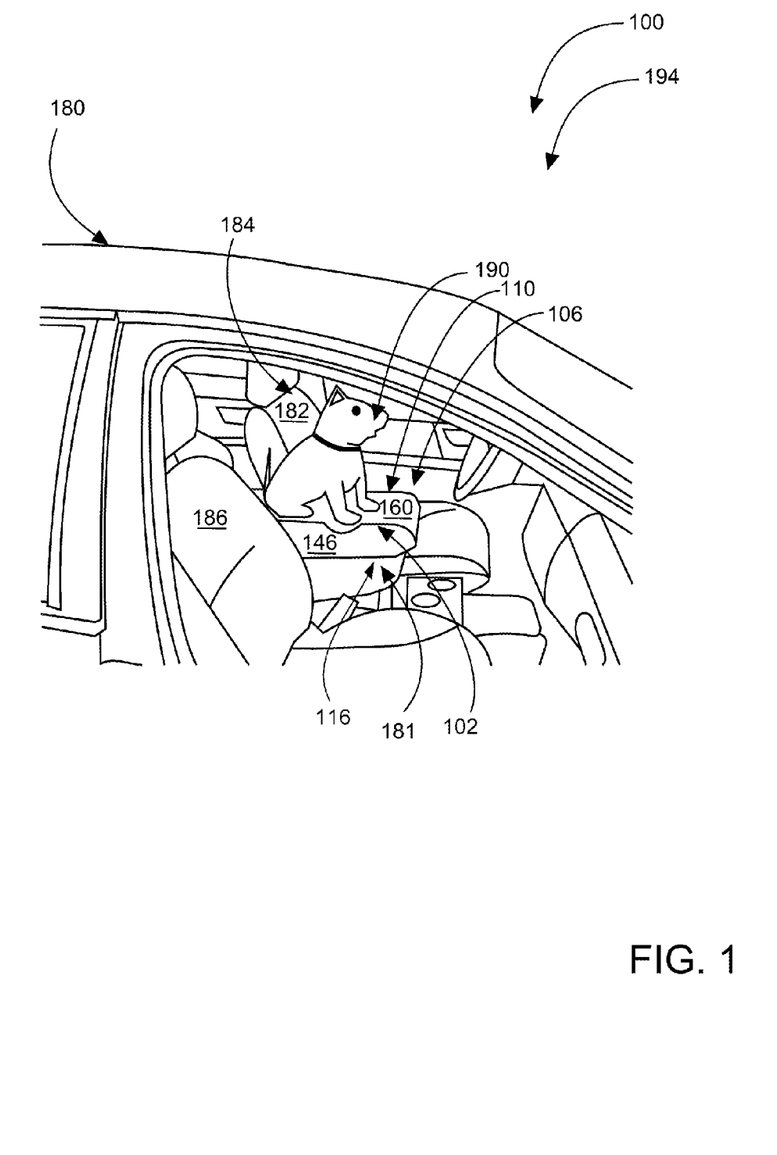
FIG. 1 shows a perspective view illustrating a pet console seat system for bridging a gap between a front seat and a back seat in a vehicle in an in-use condition according to an embodiment of the present invention.

Pet console seat 102 bridges a gap between front seat 182 and back seat 188 of vehicle 180 by creating pet console seat 102 and a planar path for pet 190 to travel between front seat 182 to back seat 188. Pet console seat 102 protects a console of the vehicle from damage caused by nails scratching and chewing with sharp incisors of pet 190. T-shaped cushion 110 is preferably coupled to bottom-board insert 150 via at least one webbing material forming pet console seat assembly 106. Bottom-board insert 150 adds structural integrity to maintain a shape of T-shaped cushion 110 in in-use condition 194 by pet 190 as shown in FIG. 1. Pet 190 may include a dog, a cat, a miniature pig or the like. It should be noted that other pet(s) 190 may use pet console seat 102.

Pet console seat 102 may be used in a small vehicle 190 including a car using pet console seat assembly 106 that is approximately 8-inches in width, 36-inches in length, and 4-inches high. Pet console seat 102 may also be used in a large vehicle 190 including a sport utility vehicle using pet console seat assembly 106 that is approximately 12-inches in width, 36-inches in length, and 4-inches high. Pet console seat 102 may further comprises a horizontal support board (not shown) located on second end 122 to bridge a first bucket back seat and a second bucket back seat together.

Figure 2:
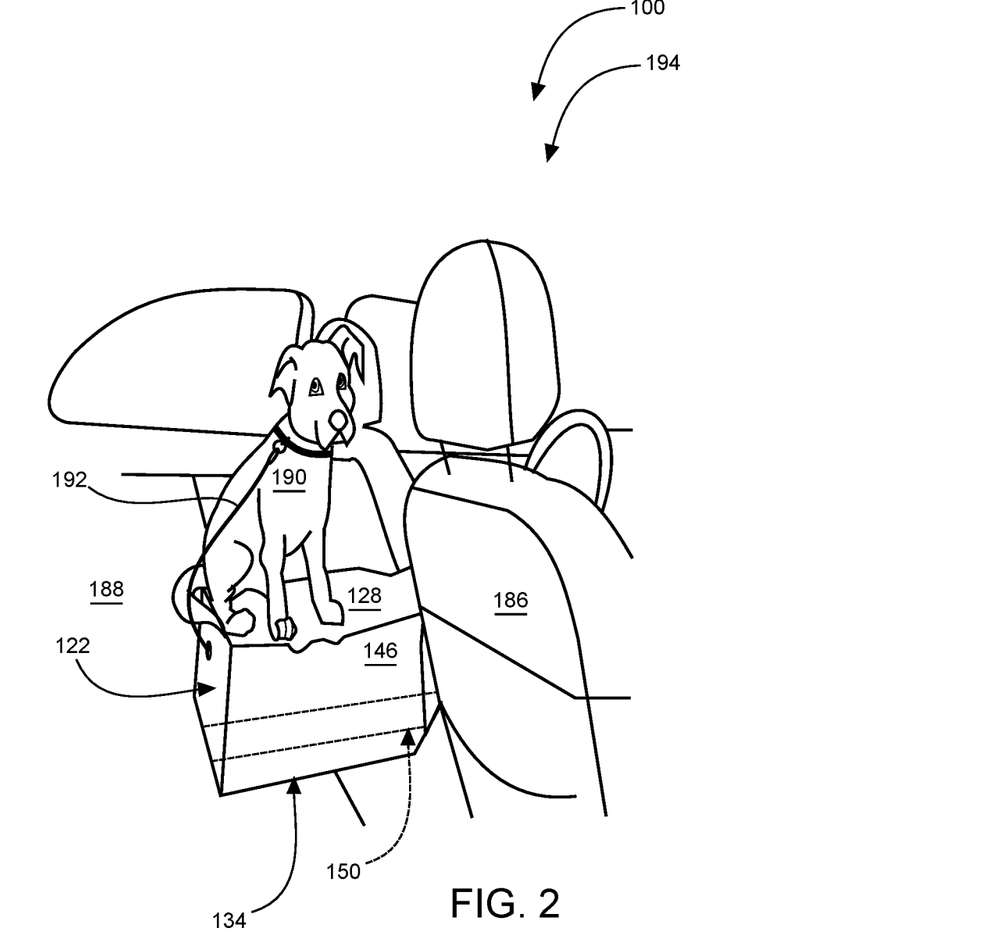
FIG. 2 shows a perspective view illustrating the pet console seat system for bridging a gap between a front seat and a back seat in a vehicle in another in-use condition according to an embodiment of the present invention.
Figure 3:
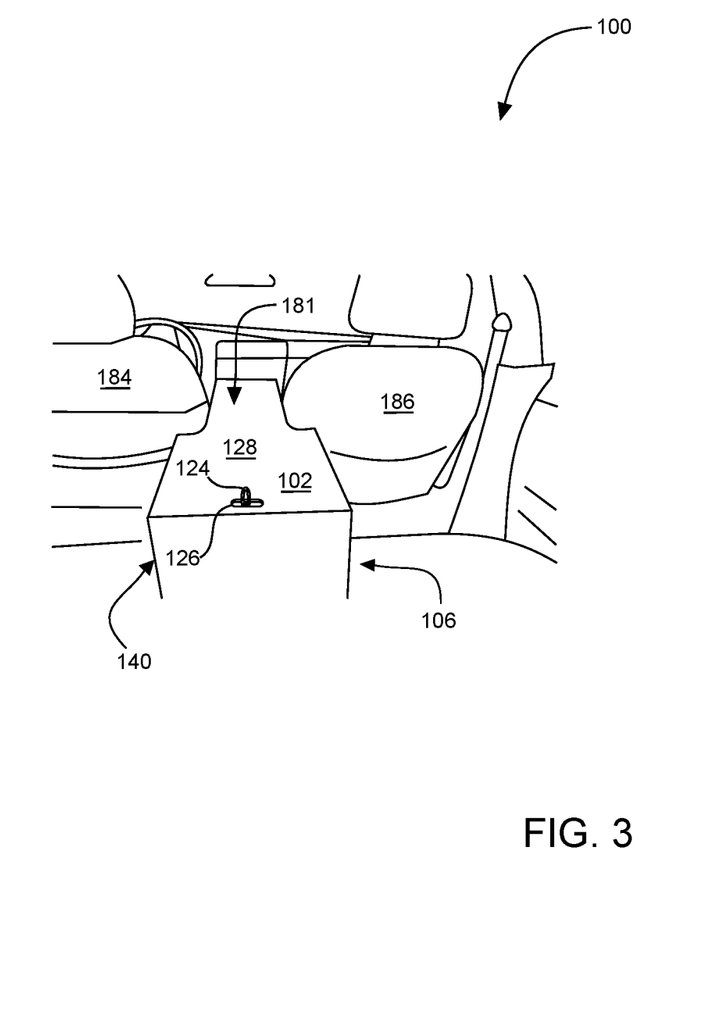
FIG. 3 is a perspective view illustrating the pet console seat assembly of the pet console seat system for bridging a gap between a front seat and a back seat in a vehicle according to an embodiment of the present invention of FIG. 1.
Figure 4:
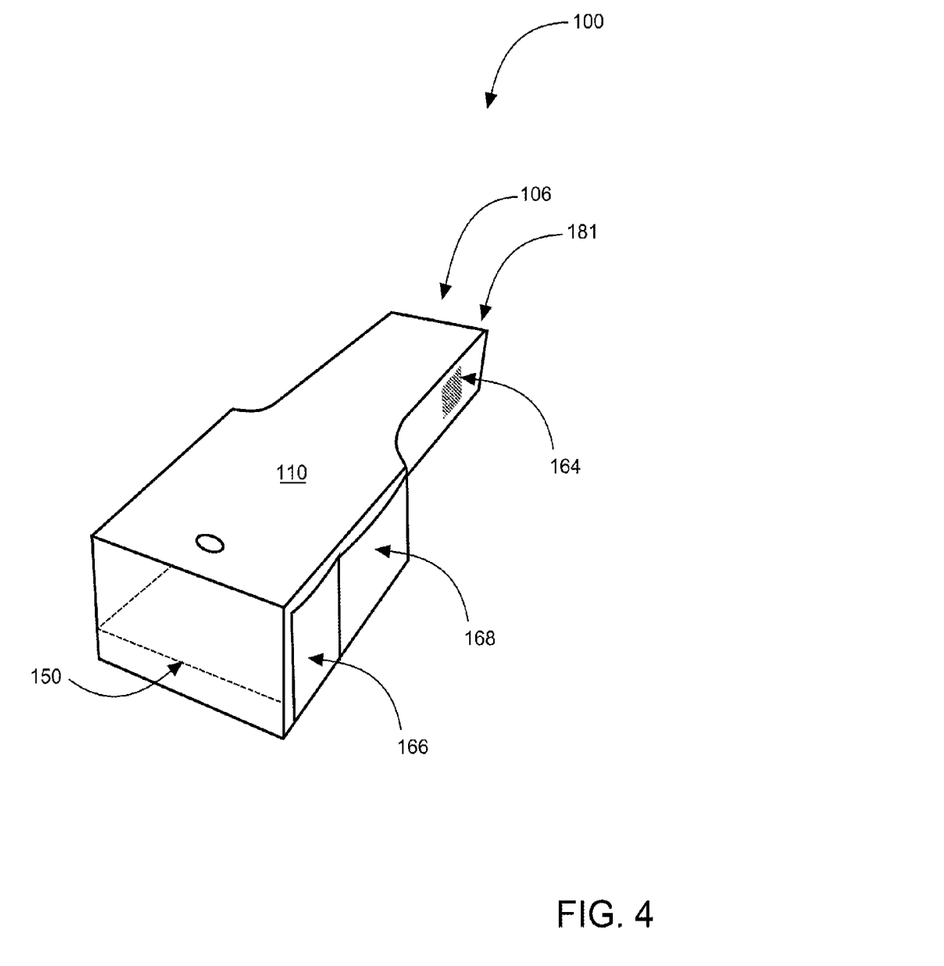
FIG. 4 is a another perspective view illustrating the pet console seat assembly of the pet console seat system for bridging a gap between a front seat and a back seat in a vehicle according to an embodiment of the present invention of FIGS. 1-3.

First end 116 is friction-fitted in between a driver's bucket seat 184 and passenger's bucket seat 186 of vehicle 180 and is planar relative to and locatable above console 181 of vehicle 180 as shown best in FIGS. 1 & 2. Second end 122 rests and is planar to back seat 188 of vehicle 180 as shown best in FIG. 2. At least one metal ring 124 may be located on second end 122 which is able to be used to couple pet-safety harness 192 removably-coupled to pet 190 to restrain pet 190 from use. At least one metal ring 124 is coupled to second end 122 of T-shaped cushion 110 via at least one button-hole slit 126.

Protective cover 160 preferably protects the T-shaped cushion 110 from fluids and hair of pet 190 and allows pet 190 to be elevated for travel in vehicle 180. Protective cover 160 is preferably removable as shown best in FIG. 5. In preferred embodiments, protective cover 160 is re-usable and machine-washable. It should be noted that protective cover 160 may be disposable in an alternate embodiment.

Figure 5:
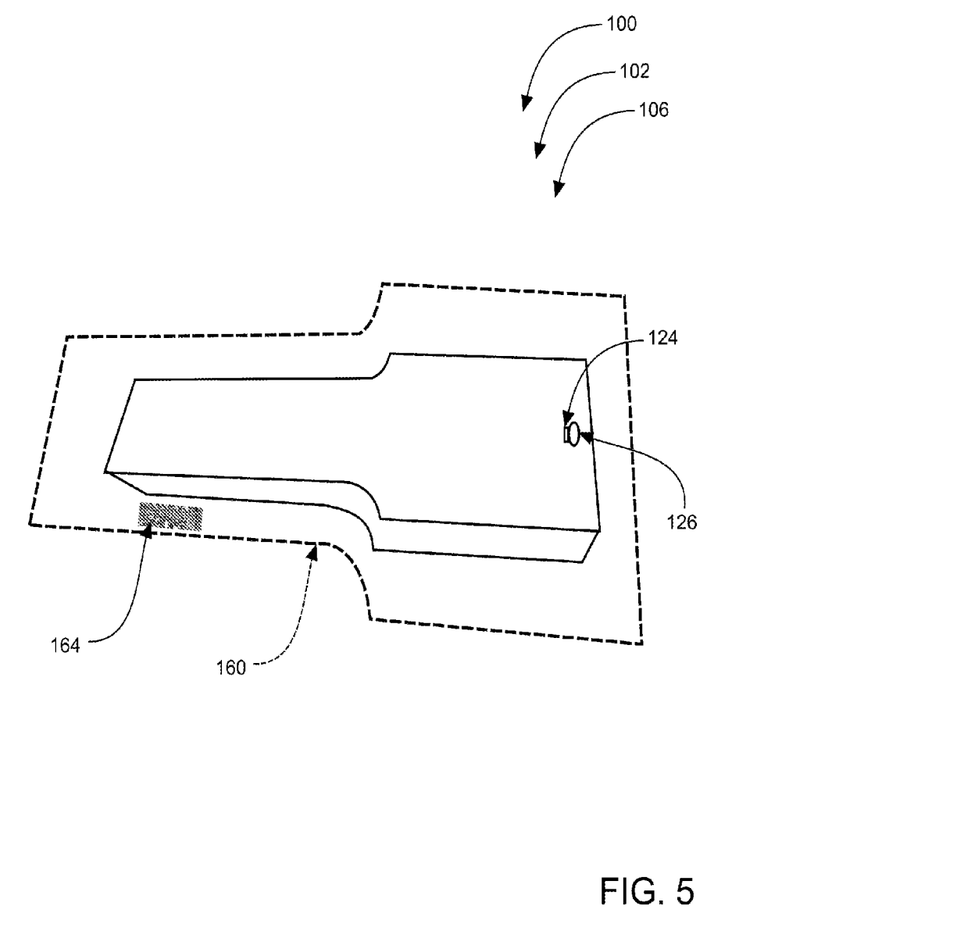
FIG. 5 is yet another perspective view (exploded) illustrating the pet console seat assembly of the pet console seat system for bridging a gap between a front seat and a back seat in a vehicle according to an embodiment of the present invention of FIGS. 1-4.

Protective cover 160 further comprises at least one fastener 164. At least one fastener 164 may comprises hook and loop fasteners. Upon reading this specification, it should be appreciated that, under appropriate circumstances, considering such issues as user preferences, design preference, structural requirements, marketing preferences, cost, available materials, technological advances, etc., other fastener arrangements such as, for example, snaps, buttons, adhesives, etc., may be sufficient.

Protective cover 160 may comprises upholstered fabric. Upon reading this specification, it should be appreciated that, under appropriate circumstances, considering such issues as user preferences, design preference, structural requirements, marketing preferences, cost, available materials, technological advances, etc., other material arrangements such as, for example, cloth, soft plastic, vinyl, etc., may be sufficient.

Protective cover 160 further comprises first pocket 166 located on right side 146 of protective cover 160 and second pocket 168 also located on right side 146 of protective cover 160. First pocket 166 and second pocket 168 are used for conveniently storing treats and supplies for pet 190 such that they are readily accessible by a driver.

Pet console seat 102 for bridging a gap between front seat 182 and back seat 188 of vehicle 180 according to an embodiment of the present invention of FIGS. 1-5 may comprise a kit (not shown). The kit may comprise the following parts: pet console seat assembly 106; a plurality of protective covers 160 in a variety of colors and fabric/materials to suit user preference; and a set of user installation instructions. The kit has instructions such that functional relationships are detailed in relation to the structure of the invention (such that the invention can be used, maintained, or the like in a preferred manner). Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different material combinations, other fasteners, parts may be sold separately such as adhesives, etc., may be sufficient.

Figure 6:
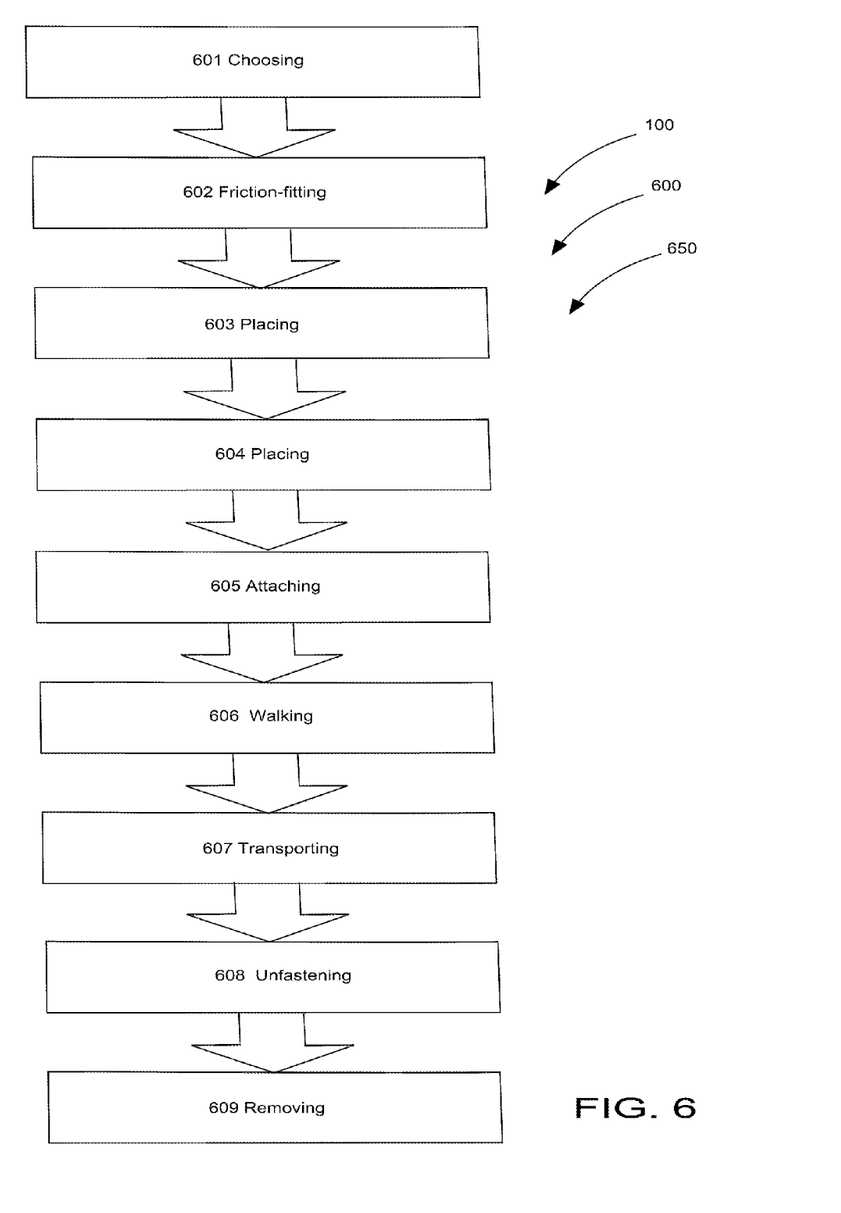
FIG. 6 is a flowchart illustrating a method of use for the pet console seat system for bridging a gap between a front seat and a back seat in a vehicle according to an embodiment of the present invention of FIGS. 1-5.

Referring now to FIG. 6, flowchart 650 illustrating method of use 600 for pet console seat 102 for bridging a gap between front seat 182 and back seat 188 of vehicle 180 according to an embodiment of the present invention of FIGS. 1-5.

Method of use 600 for pet console seat 102 for bridging a gap between front seat 182 and back seat 188 of vehicle 180 preferably comprises the steps of: step one 601 choosing pet console seat assembly 106 to fit dimensions of vehicle 180; step two 602 friction-fitting first end 116 of T-shaped cushion 110 in-between driver's seat 184 and passenger's seat 186 of vehicle 180; step three 603 placing second end 122 of T-shaped cushion 110 on back seat 188 in vehicle 180; step four 604 placing pet console seat 102; step five 605 attaching pet safety harness 192 to metal ring 124 on second end 122 of pet console seat 102 to secure pet 190; step six 606 pet 190 walking from pet console seat 102 to back seat 188; step seven 607 transporting pet 190; step eight 608 un-fastening pet safety harness 192 from said metal ring 124; and step nine 609 removing pet 190 from pet console seat 102 once a destination is reached.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A combination of a vehicle and a pet console seat system for bridging a gap between front seats and a back seat of said vehicle, said combination comprising:
   a vehicle including
      a back seat substantially extending an interior width of said vehicle and including a top surface;
      two front seats separated a distance from one another and forming a space therebetween;
         wherein said front seats are separated a distance from said back seat and form said gap therebetween;
      a console placed in between said two front seats in said space and having a top surface substantially parallel to and at an equal height to said top surface of said back seat; and a pet console seat forming a pet console seat assembly having
  a T-shaped cushion including
    a first end,
      wherein said first end is friction-fitted in between said two front seats of said vehicle in said space and is adapted to be placed upon said top surface of said console;
    a second end,
      wherein said second end rests upon said top surface of said back seat;
    a top side,
    a bottom side,
    a left side, and
    a right side;
  an approximately 5-foot by 5-foot bottom-board insert; and
  a protective cover coupled to said T-shaped cushion;
wherein said pet console seat bridges said gap between said front seats and said back seat of said vehicle and creates a planar path for a pet to travel between said front seats to said back seat;
wherein said bottom-board insert adds structural integrity to maintain a shape of said T-shaped cushion in an in-use condition by said pet; and
wherein said protective cover protects said T-shaped cushion from fluids and hair of said pet.

2. The combination of claim 1 wherein said pet console seat protects said console of said vehicle from damage caused by nails scratching and teeth chewing of said pet.

3. The combination of claim 1 wherein said pet console seat is approximately 8-inches in width, 36-inches in length, and 4-inches in height.

4. The combination of claim 1 wherein said pet console seat is approximately 12-inches in width, 36-inches in length, and 4-inches in height.

5. The combination of claim 1 wherein said protective cover is disposable.

6. The combination of claim 1 wherein said protective cover is reuseable and machine-washable.

7. The combination of claim 1 wherein said protective cover comprises upholstered fabric.

8. The combination of claim 1 wherein said protective cover further comprises a first pocket and a second pocket both located on a right side of said protective cover.

9. The combination of claim 8 wherein said first pocket and said second pocket are used for storing treats and supplies for said pet.

10. The combination of claim 1 further comprises at least one metal ring coupled to said second end of said T shaped cushion via at least one button-hole slit.

11. The combination of claim 10 wherein said at least one metal ring is used to couple a pet-safety harness removably-coupled to said pet to restrain said pet.

12. The combination of claim 1 wherein said protective cover is removable.

13. The combination of claim 12 wherein said protective cover further comprises at least one fastener.

14. The combination of claim 13 wherein said at least one fastener comprises hook and loop fasteners.

15. The combination of claim 13 wherein said at least one fastener comprises at least one snap.

\* \* \* \* \*